US007937311B1

(12) United States Patent
Zangari et al.

(10) Patent No.: US 7,937,311 B1
(45) Date of Patent: May 3, 2011

(54) APPARATUSES, METHODS, AND SYSTEMS FOR EXCHANGE FUND TRANSACTIONS

(75) Inventors: Peter J. Zangari, Fairfield, NJ (US); Reha Hüsnü Tütüncü, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

(21) Appl. No.: 11/613,154

(22) Filed: Dec. 19, 2006

Related U.S. Application Data

(60) Provisional application No. 60/752,276, filed on Dec. 20, 2005.

(51) Int. Cl.
*G06Q 40/00* (2006.01)
(52) U.S. Cl. .......................................... 705/36 R; 705/35
(58) Field of Classification Search .................. 705/35, 705/36 R, 37, 38
See application file for complete search history.

(56) References Cited

U.S. PATENT DOCUMENTS

| 6,012,925 | A | * | 1/2000 | Kelly et al. | 434/107 |
| 2004/0054612 | A1 | * | 3/2004 | Ocampo | 705/36 |
| 2006/0026085 | A1 | * | 2/2006 | Zoric | 705/35 |
| 2006/0277124 | A1 | * | 12/2006 | Gerrietts, II | 705/35 |

OTHER PUBLICATIONS

Grauer et al. "Investment Strategies: A Comparison of Returns and Investment Policies" Management Science, vol. 39, No. 7, Jul. 1993, pp. 856-871.*

Monma et al. "Analysis of Heuristics for Preemptive Parallel Machine Scheduling With Batch Setup Times" Operations Research, vol. 41, No. 5, Sep.-Oct. 1993, pp. 981-993.*

* cited by examiner

*Primary Examiner* — Kelly Campen
(74) *Attorney, Agent, or Firm* — Chadbourne & Parke LLP; Walter G. Hanchuk (57) ABSTRACT

Apparatuses, methods, and systems for generating transactions for investors to contribute to various asset funds and achieve investment fund optimization for such exchanges. An exemplary exchange fund transactor generates investor transactions and/or adjusts a portfolio to include investor transactions that contribute to various asset funds and achieve investment fund optimizations for such exchanges.

20 Claims, 2 Drawing Sheets

APPARATUSES, METHODS, AND SYSTEMS FOR EXCHANGE FUND TRANSACTIONS

RELATED APPLICATIONS

Applicants hereby claims priority under 35 USC §119 for U.S. provisional patent application Ser. No. 60/752,276 filed Dec. 20, 2005, entitled "APPARATUSES, METHODS AND SYSTEMS FOR EXCHANGE FUND TRANSACTIONS," hereby incorporated by reference.

FIELD

The present disclosure is directed generally to an apparatus, method, and system of building funds, and more particularly, to an apparatus, method and system to design, solve and trade exchange funds.

BACKGROUND

Computerized marketplaces of all kinds range from simple classified ad bulletin boards to complex mainframe-based market systems such as NASDAQ, which offers a real-time market-making system for tens of thousands of securities brokers. These marketplace systems centralize interactions between its constituent providers and seekers of assets, goods, opportunities and services. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Other known systems automate the open outcry process used in trading pits. Importantly, securities trading is heavily regulated. Many of the terms and conditions prevalent in securities trades are limited by convention and regulation. Automated securities trading systems necessarily reflect these constraints. Such financial systems typically rely on underlying information technology systems, user interfaces, networks, and/or other core technologies.

SUMMARY

The disclosure details the implementation of apparatuses, methods, and systems for exchange fund transactions. Prior to the inventive aspects of the present disclosure, it was not possible to easily optimize investor contributions to various asset funds.

In accordance with certain aspects of the disclosure, the above-identified problems are overcome and a technical advance is achieved in the art of exchange fund transactions. As such, the disclosure details how to generate transactions for investors to contribute to such various asset funds and achieve investment fund optimizations for such exchanges. An exemplary exchange fund transactor includes a method to generate investor transactions that contribute to various asset funds and achieve investment fund optimizations for such exchanges.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Exchange Fund Transactor

The present disclosure illustrates inventive aspects of an exchange fund transactor. The exchange fund transactor may generate investor transactions that contribute to various asset funds and achieve investment fund optimizations for such exchanges.

Solving the Exchange Fund Problem

This paper presents the current 'exchange fund problem' (EFP) and a solution to the problem using our new optimizer. The paper is organized as follows. First, we present the EFP in terms of an example. Second, we develop a model of the EFP. The third section provides a mathematical formulation of the problem and section four describes an implementation procedure. The fifth and final section compares the results of a sample re-balance with the results produced by the optimizer. Tables B and C provide important details on comparing the two re-balances.

1. Example

We begin with an example where we have 2 exchange funds, 2000 and 2001. We assume there are 3 investors in each fund.

The following table shows each investor's 'contribution' to the 2000 fund. For example, investor A contributes 100 shares of ABC at a stock price of \$10/share. (Note: variables that appear in the following tables are defined in section 2).

2000 Fund

| Investor | Shares | Stock | Stock price | Market Value | % Ownership |
|---|---|---|---|---|---|
| A | 100 ($S_{h,f}$) | ABC | 10 | 1,000 ($V_{h,f}$) | 10% ($c_{h,f}$) |
| B | 200 | DEF | 20 | 4,000 | 40% |
| C | 200 | GHI | 25 | 5,000 | 50% |
| Total | | | | 10,000 ($V_f$) | 100% |

We create a 2000 feeder fund as shown in the following table.

| | Stocks | | |
|---|---|---|---|
| Investor | ABC | DEF | GHI |
| A | 20 | 20 | 20 |
| B | 40 | 80 | 80 |
| C | 50 | 100 | 100 |
| Total | 100 ($S_{h,f}$) | 200 | 200 |

Note the diversification benefits that the feeder fund provides. For example, from the first table we know that investor A owns 10% of the 2000 fund. Since there are 200 shares of DEF (originally contributed by investor B), investor A owns 20 shares in the feeder.

The next two tables show similar information for the 2001 fund.

2001 Fund

| Investor | Shares | Stock | Stock price | Market Value | % Ownership |
|---|---|---|---|---|---|
| D | 500 ($S_{h,f}$) | JKL | 30 | 15,000 ($V_{h,f}$) | 30% ($c_{h,f}$) |
| E | 500 | MNO | 40 | 20,000 | 40% |
| F | 300 | PQR | 50 | 15,000 | 30% |
| Total | | | | 50,000 | |

Ownership in 2001 fund for each investor (in shares)

| | Stocks | | |
|---|---|---|---|
| Investor | JKL | MNO | PQR |
| D | 150 | 150 | 90 |
| E | 200 | 200 | 120 |
| F | 150 | 150 | 90 |

Given the two feeder funds, we construct a master fund which provides an additional level of diversification. Each feeder fund "owns" a portion of the master fund. We refer to the combined master and feeder fund as the modified feeder.

Example of Creating a Master Fund

The term "drop" refers to moving stocks from the feeder to the master.

The drop from 2000 fund into master 100 shares of ABC with a market value of 1,000

200 shares of DEF with a market value of 4,000

Total drop has a market value of 5,000

The drop from 2001 fund into master 500 shares of MNO with a market value of 20,000

Total drop has a market value of 20,000

The drop and master fund . . . .

Total market value of master fund is 25,000

2000 fund "owns" 20% of master (5,000/25,000)

2001 fund "owns" 80% of master (20,000/25,000)

Master Fund after the Drop

| Stock | Shares | Market Value | % ownership of master by fund | |
|---|---|---|---|---|
| ABC | 100 ($S_{M,k,f}$) | 1,000 ($V_{M,k,f}$) | | |
| DEF | 200 | 4,000 | 2000 | 20% ($d_f$) |
| MNO | 500 | 20,000 | 2001 | 80% |
| Total | | 25,000 ($V_M$) | | |

Modified Feeder Funds after Drop

2000 Fund owns its original shares that were not dropped plus 20% of master

2001 Fund owns its original shares that were not dropped plus 80% of master

| | 2000 Fund | | 2001 Fund | | |
|---|---|---|---|---|---|
| Stock | Shares | Market Value | Shares | Market Value | Total MV |
| ABC | 20 ($S_{k,f}$) | 200 ($V_{k,f}$) | 80 ($S_{k,f}$) | 800 ($V_{k,f}$) | 1,000 ($V_k$) |
| DEF | 40 | 800 | 160 | 3,200 | 4,000 |
| GHI | 200 | 5,000 | 0 | 0 | 5,000 |
| JKL | 0 | 0 | 500 | 15,000 | 15,000 |
| MNO | 100 | 4,000 | 400 | 16,000 | 20,000 |
| PQR | 0 | 0 | 300 | 15,000 | 15,000 |
| Total | | 10,000 | | 50,000 | 60,000 |

Before (old) and after (new) for 2000 and 2001 fund. Note that the new fund represents the Modified Feeder.

| | 2000 Fund | | | | 2001 Fund | | | | |
|---|---|---|---|---|---|---|---|---|---|
| | Shares | | Market Value | | Shares | | Market Value | | |
| Stock | Old | New | Old | New | Old | New | Old | New | New Market Value |
| ABC | 100 | 20 | 1000 | 200 | 0 | 80 | 0 | 800 | 1,000 |
| DEF | 200 | 40 | 4000 | 800 | 0 | 160 | 0 | 3200 | 4,000 |
| GHI | 200 | 200 | 5000 | 5000 | 0 | 0 | 0 | 0 | 5,000 |
| JKL | 0 | 0 | 0 | 0 | 500 | 500 | 15,000 | 15,000 | 15,000 |
| MNO | 0 | 100 | 0 | 4000 | 500 | 400 | 20,000 | 16,000 | 20,000 |
| PQR | 0 | 0 | 0 | 0 | 300 | 300 | 15,000 | 15,000 | 15,000 |
| Total | | | 10,000 | 10,000 | | | 50,000 | 50,000 | 60,000 |

2. Model Set Up

| | |
|---|---|
| H | Investors: h = 1, 2, . . . , H |
| F | Feeder Funds: f = 1, 2, 3, . . . , F |
| K | Stocks: k = 1, 2, 3, . . . , K. (note that K need not equal H) |
| $V_f$ | Market Value of fund f |
| $S_{k,f}$ | Number of shares of stock k in fund f |
| $P_k$ | Price per share of stock k |
| $T_f$ | The set of stocks k in fund f. |

Let a superscript '0' on any variable represent a pre-optimization value. This superscript will be used when we evaluate the drop. Also, we assume that we mark-to-market positions. This assumption can be relaxed. We assume that funds 1, . . . , F−1 are existing feeder funds and fund F is to be constructed with current investor contributions.

Investor h $S_{h,f}$ Quantity of shares that investor h contributes to fund f.
$V_{h,f}$ Value of shares that investor h contributes to fund f.
$c_{h,f}$ Percent ownership of h in f:

$$c_{h,f} = V_{h,f}/V_f \text{ and } \sum_h c_{h,f} = 1$$

Note that $S_{h,f}$ and $S_{k,f}$ can be used interchangeably. The same goes for $V_{h,f}$ and $V_{k,f}$. ($V_{k,f}$ denotes the market value of stock k in fund f.)

Master Fund $S_{M,k,f}$ Quantity of shares of stock k from fund f that is in master fund $S_{M,k}$ Total quantity of shares of stock k in master fund.

$$S_{M,k} = \sum_f S_{M,k,f}$$

$V_{M,k,f}$ Value of shares of stock k from fund f that is in master fund $V_{M,k,f}$ Value of fund f that is part of master fund. Or, how much master that fund f "owns".

$$V_{M,f} = \sum_{k \in T_f} S_{M,k,f} P_k$$

$V_{M,k}$ Total value of shares of stock k in master fund.

$$V_{M,K} = \sum_f V_{M,k,f}$$

$V_M$ Value of the master fund.

$$V_M = \sum_f V_{M,f} = \sum_f \sum_{k \in T_f} V_{M,k,f}$$

$d_f$ Fund f's fractional ownership in the master fund $$d_f = V_{M,f}/V_M \text{ and } \sum_f d_f = 1$$

Modified Feeder Fund (after Master has been Created)

$S_{k,f}$ Quantity of shares of stock k in fund f $S_{k,f} = [(S_{k,f}^0 - S_{M,k,f}) + d_f S_{M,k}]$ $V_{k,f}$ Value of shares of stock k in modified fund f $V_{k,f} = P_k S_{k,f}$ $V_{k,f} = [(V_{k,f}^0 - V_{M,k,f}) + d_f V_{M,k}]$ Investor's Holdings in Modified Feeder Fund (after Master has been Created)

$S_{h,k} = c_{h,f} \times [(S_{k,f}^0 - S_{M,k,f}) + d_f S_{M,k}]$ $V_{h,k} = c_{h,f} \times [(V_{k,f}^0 - V_{M,k,f}) + d_f V_{M,k}]$ Additional Variables Define the value of fund f:

$$V_f = \sum_{k \in T_f} V_k \text{ and } V_f^0 = \sum_{k \in T_f} V_k^0$$

Define total value of exchange fund (across all funds)

$$V = \sum_f \sum_{k \in T_f} V_k \text{ and } V^0 = \sum_f \sum_{k \in T_f} V_k^0$$

Fraction of fund f's ownership in master fund $$d_f = \frac{V_{M,f}}{V_M} = \frac{\sum_{k \in T_f} V_{M,k,f}}{\sum_f \sum_{k \in T_f} V_{M,k,f}}$$

Stock k's weight in fund f $$w_{k,f} = \frac{V_{k,f}}{V_f} \text{ weight of stock } k \text{ in modified feeder fund } f \sum_k w_{k,f} = 1$$

Example of Ownership by Investor after Drop

Each investor owns a portfolio that is the original percentage ownership in the new modified feeder fund. For example, investor A originally owned 10% of the 2000 fund. Investor A now owns: 2 shares ($S_{k,f}$) of ABC, 4 shares of DEF, 20 shares of GHI and 10 shares of MNO. The corresponding market values, ($V_{k,f}$), are 20 (ABC), 80 (DEF), 500 (GHI) and 400 (MNO).

Example of calculating the value of investor h's holdings on the kth stock. Let h=Investor A and k=ABC.

$d_f=0.20; V_{M,k}=1,000; V_{k,f}^0=1,000$ $V_{k,f}=[0+0.20\times 1,000]=200$ (value of stock $k$ in fund $f$)

and $c_{h,f}=0.10$ $$V_{h,k} = c_{h,f} \times [(V_{k,f}^0 - V_{M,k,f}) + d_f V_{M,k}]$$
$$= 0.10 \times [(1,000 - 1,000) + 0.20 \times 1,000]$$
(value of stock $k$ that $h$ owns)
$$= 20$$

3. Problem & Solution 3.1 Problem

A list of names, with associated number of shares, is being considered for the construction of a new feeder fund. We need to determine what names, and how much of each name, to accept into the fund. Given the names that we accept, we need to determine what names (and quantities) we should drop into the master fund. Existing feeder funds will not be modified. However, since the master fund will change with the additional drops, the risk characteristics of the combined feeder/master funds (i.e., modified feeder funds) will be affected. Therefore, the decisions to accept securities into the new feeder and drop in the master are interrelated and the decision-making process is governed by, at least, two objectives:

(o1) There is no increase in risk (e.g., tracking-error vs SP 500) in any of the existing feeder funds (o2) Industry over/under-weights as well as betas of each fund are limited to some values When attempting to reach our objectives, we operate under the following sample constraints:

(c1) Cannot drop more that 70% of feeder fund (c2) Of the dropped securities, no one name can be more than 25% of the dropped value (c3) Of the dropped securities, 5 names cannot be more than 50% of the dropped value (c4) Cannot drop XYZ stock.

(c5) Largest marginal contributions to tracking error (MCTEs) in existing funds can not increase and the largest MCTE for the new modified feeder is below a threshold value, e.g. 15%.

3.2 Solution

Maximize the value of the fund such that we reach our exposure and tracking error targets and all constraints are satisfied. Mathematically, we have $$\max_{S_k} \sum_f \sum_{k \in T} V_{k,f} \quad (A1)$$

where $$V_{k,f} = [(V_{k,f}^0 - V_{M,k,f}) + d_f V_{M,k}] \text{ or } S_{k,f} = [(S_{k,f}^0 - S_{M,k,f}) + d_f S_{M,k}] \quad (E1)$$

$$d_f = \frac{V_{M,f}}{V_M} = \frac{\sum_{k \in T_f} V_{M,k,f}}{\sum_f \sum_{k \in T_f} V_{M,k,f}} \quad (E2)$$

since $V_{k,f} = S_{k,f} P_k$ and $V_{M,k,f} = S_{M,k,f} P_k$, we can re-write (A1) as $$\max_{S_{m,k,f}} \sum_f \sum_{k \in T_f} \left[ \left(1 - \frac{\sum_{k \in T_f} S_{M,k,f} P_k}{\sum_f \sum_{k \in T} S_{M,k,f} P_k}\right) (S_{k,f}^0 P_k - S_{M,k,f} P_k) + \left(1 - \frac{\sum_{k \in T_f} S_{M,k,f} P_k}{\sum_f \sum_{k \in T_f} S_{M,k,f} P_k}\right) S_{M,k,f} P_k \right] \quad (A2)$$

The decision variable, $S_{M,k,f}$, represents the number of shares of the kth stock in the master fund. The value we are maximizing is subject to the following constraints:

$$S_{M,k,f} \leq S_{k,f} \leq S_{k,f}^{max} \quad (C0)$$

where $S_{k,f}^{max}$ is the maximum amount of shares available to be accepted into fund. Given $S_{M,k,f}$, we use (E1) and (C0) to derive $S_{k,f}$.

$$\frac{V_{M,f}}{V_f^0} \leq 0.70 \quad (C1)$$

$$\frac{V_{k,f}}{V_{M,f} - V_{M,f}^0} \leq 0.25 \quad (C2)$$

$$\sum_{any\,5\,stocks} \frac{V_{k,f}}{V_{M,f} - V_{M,f}^0} \leq 0.50 \quad (C3)$$

All portfolio weights must sum to one.

$$\sum_{k \in f} w_{k,f} = 1 \quad (C4)$$

for all f and $$\sum_{k \in M} w_{M,k,f} = 1$$

for the master.

We can place on portfolio exposures.

$$|w_f^T b| \leq c \quad (C5)$$

where $b_j$ represent an N-vector of asset level exposures to the jth factor and c is some scalar that defines the constraint.

We limit the risk that each fund takes (in absolute terms or relative to a benchmark).

$$\sqrt{w_f^T \Sigma_f w_f} \leq TE_f$$

where $\Sigma_f$ represents a covariance matrix of the stock returns k∈f
$w_f$ is a vector of portfolios weights for the modified feeder fund f.
$TE_f$ represent the targeted tracking error for fund f. $TE_f$ can be anything, an exogenous value or determined by the current level of risk.

In order to make sure that we do not increase the risk of any one of the existing feeder funds as we add new stocks to the master fund, we would impose the restriction (C6) for each one of these funds as well as the new feeder fund.

Finally, we need to incorporate uncertainty in the names and quantities that would be available to accept and, possibly, to drop. This gets to the issue when we need to make a decision now on whether we should drop some stocks or wait until some future point in time when we expect to receive stock with a level of uncertainty.

We incorporate uncertainty into the optimization problem by introducing variables, $\rho_{k,f}$, which take values between 0 and 1 and represent the (subjective, user-defined) probability of receiving amount $S_{k,f}$. Therefore, we can re-define the values $V_{k,f} = \rho_{k,f} S_{k,f}$.

4. Problem Reformulation and Implementation

Some elements of the formulation of the exchange fund problem outlined above carry nonlinearities that cannot be easily handled by the optimization solvers that we currently employ. Therefore, in this section we consider a simplified reformulation of the problem that avoids these nonlinearities. We first list the assumptions that guide our reformulation:

1. Feeder Funds 1 through F−1 have been created in the past and there is an existing Master Fund generated by earlier contributions from these Feeder Funds.

2. There is currently a pool of available securities contributed by investors and being considered for inclusion in Feeder Fund F (this is the latest dated Feeder Fund) and/or the Master Fund.

3. No inflow/outflow of securities will be considered for Feeder Funds 1 through F−1, other than through the modification of the Master Fund. These assumptions are consistent with our current practice regarding exchange funds. Under these assumptions, our decision variables are the following: For each security k in the current pool of contributed securities, $V_{k,f}$ is the amount to include in the Feeder Fund F, and $V_{M,k,f}$ is the amount to drop in the existing Master Fund. Note that it is more convenient to work with "value" variables rather than "share" variables for the purposes of calculating ownership ratios, etc.

4.1 Reconstructed Master Fund

New value of stock $k$ shares in master=old value+ drops $$V_{M,k} = V_{M,k}^0 + V_{M,k,f}$$

New total value of master=old value+total drops $$V_M = V_M^0 + \sum_k V_{M,k,F}$$

4.2 Earlier Feeder Funds

Each one of the feeder funds owns two types of securities—those that they have the sole ownership of, and those that they own through their shared ownership of the Master Fund. The reconstruction of the Master Fund with new drops does not affect the securities that each Feeder solely owns, but the ownership ratio and the composition of securities in the Master Fund changes after the reconstruction. Recalling that $d_f$ denotes the ownership fraction of feeder fund f in the Master Fund, we see that the net change in the value of stock k shares in feeder fund f can be written as follows:

$$V_{k,f} - V_{k,f}^0 = d_f V_{M,k} - d_f^0 V_{M,k}^0$$

where $$d_f = d_f^0 \cdot \frac{V_M^0}{V_M} = d_f^0 \cdot \frac{V_M^0}{V_M^0 + \sum_k V_{M,k,F}}$$

Observe that the total value of the Feeder Fund f is not affected with this modification. In other words, $$V_f = \sum_k V_{k,f} = \sum_f V_{k,f}^0 = V_f^0.$$

Given these identities, we revisit the tracking error constraints for feeder funds f, for f from 1 through F−1:

$$\sqrt{(w_f - w_{BM})^T \Sigma_f (w_f - w_{BM})} \leq TE_f$$

In this constraint, $w_f$ is a vector of portfolio weights for feeder fund f and $\Sigma_f$ is the covariance matrix of stock returns. $w_{BM}$ denotes the weight vector for a benchmark portfolio. Defining the value vector for fund f as $\vec{V_f} = [V_{1,f} \ldots V_{K,f}]^T$ (note: we will use the notation $\vec{U}$ to denote the vector whose components are $U_1, \ldots, U_K$ throughout the remainder of this document) and observing that $$w_f = \frac{1}{V_f} \vec{V_f} = \frac{1}{V_f^0} \vec{V_f}$$

we can rewrite the tracking error constraint in terms of the value vector rather than the weight vector:

$$\sqrt{(\vec{V_f} - V_f^0 w_{BM})^T \Sigma_f (\vec{V_f} - V_f^0 w_{BM})} \leq TE_f V_f^0.$$

This conversion from the weights to the values is the first step in reducing the nonlinearity in the TE constraint. The next step is to evaluate the vector $\vec{V_f}$:

$$\vec{V_f} = \vec{V_f^0} + d_f \vec{V_M} - d_f^0 \vec{V_M^0} = \vec{V_f^0} + d_f^0 \frac{V_M^0}{V_M^0 + \sum_k V_{M,k,F}} \vec{V_M} - d_f^0 \vec{V_M^0}.$$

Inserting this formula into the TE constraint and multiplying both sides by $$V_M^0 + \sum_k V_{M,k,F}$$

we obtain the final reformulation of this constraint. We do not reproduce the resulting complicated constraint but we emphasize that this reformulation process generates a so-called second-order cone constraint that can be handled efficiently using commercial and academic software (For this we used SDPT3, a freeware cone optimizer written by R. Tütüncü and his former colleagues. Axioma's product has second-order cone features and we expect to use it in the production stage). Our ability to rewrite the TE constraint as a second-order cone constraint is the main reason for this reformulation.

4.3 New Feeder Fund

The tracking error constraint for the new feeder fund can be rewritten as above to reduce the nonlinearities in the formulation. However, the resulting constraint is not a second-order cone constraint. The reason for this is that, for the new feeder fund, the decisions regarding the drops in the Master Fund not only affect the Master Fund composition but also the ownership share of the new Feeder Fund in the reconstructed Master Fund. The coupling of these two changes produces a nonlinear effect that we can not remove by reformulation or change of variables. In our tests, we address this problem by assuming that all available securities in the pool will be accepted either in the sole ownership of the new feeder or will be accepted into the Master Fund. This assumption may not always be reasonable, especially if there are securities that form a large percentage of the feeder pool and would not permit us to satisfy the TE constraints should they be accepted to the Feeder or the Master in their entirety. We were able to accept all contributions in the past. Furthermore, even when the assumption is not satisfied, the formulation we obtain by using this assumption provides a good first order approximation to the actual nonlinear constraint. With this assumption, a change of variables recovers the second-order cone structure in the TE constraint and we can solve the problem.

4.4 Objective Function

Since the total value of each one of the earlier feeder funds will remain the same (see comments above), maximizing the total value of all feeder funds and the master fund is equivalent to maximizing the total value of securities accepted to the new feeder fund (for its sole ownership) and the total value of securities to be dropped in the Master fund:

$$\max \sum_k V_{k,F} + \sum_k V_{M,k,F}$$

This version of the objective function simplifies the equivalent function given in (A2).

4.5 Constraints

To avoid using duplicate variables (one for shares, one for values) we replaced the following bounds $$S_{M,k,f} \leq S_{k,f} \leq S_{k,f}^{max} \quad \text{(C0)}$$

with equivalent bounds on the value variables:

$$0 \leq V_{k,F}, 0 \leq V_{M,k,F}, V_{k,F} + V_{M,k,F} \leq S_{k,F}^{max} P_k. \quad \text{(C0')}$$

Portfolio exposure constraints were similarly reformulated using value variables rather than weight variables.

Recall the following constraints:

$$\frac{V_{M,f}}{V_f^0} \leq 0.70 \quad \text{(C1)}$$

$$\frac{V_{k,f}}{V_{M,f} - V_{M,f}^0} \leq 0.25 \quad \text{(C2)}$$

Again, since nonlinearity of the constraints is undesirable for the optimizers we use, we reformulate these constraints:

$$0.70 \sum_k V_{k,F} - 0.30 \sum_k V_{M,k,F} \geq 0 \quad \text{(C1')}$$

$$V_{M,k,F} \leq 0.25 \sum_k V_{M,k,F} \quad \text{(C2')}$$

The constraint (C3), stating that "of the dropped securities, 5 names cannot be more than 50% of the dropped value" is more complicated. In the mathematical formulation of the problem, if we wish to this constraint before running an optimization, we must duplicate the constraint for each 5 name combination from among the securities available for dropping in the Master Fund since we do not know which five securities will have the largest holdings in the pre-optimization stage. If, say, there were 50 names available for dropping in the master, this would require $$\binom{50}{5} = 2,118,760$$

duplicates of the constraint, one for each 5 name combination, prohibiting a solution in a reasonable time. Instead, we use the following "cutting plane" strategy: We first solve the problem ignoring the 5-name constraint. If the solution violates the 5-name constraint, we identify the five largest master drops, impose the constraint that these 5 names can not exceed 50% of the dropped value and re-solve. The new solution may violate the constraint with a different list of top five names, so we repeat the process until we achieve a solution satisfying the constraint. While this approach requires us to run multiple optimizations, often only a handful of iterations are necessary. Furthermore, the process can be automated and a solution is obtained in less than a few minutes. The constraint that XYZ stock can not be dropped in the master is easily handled by setting the variable $V_{M,GS,F}=0$.

MCTE constraints are complicated. They result in non-convex (and therefore, generally much more difficult) formulations even without the additional complications in the exchange problem arising from feeder/master alternatives. Therefore, instead of addressing them directly, we used the following approach. As in the 5-name constraint, we initially ignored the MCTE constraints. Once a solution satisfying the 5-name constraint was generated, we checked the MCTEs of the solution. After identifying assets with high MCTEs, we limited their active weight using linear constraints. Since the MCTEs are roughly proportional to the active weights (MCTEs are roughly but not exactly proportional to the active weights since the relationship between these two measures is nonlinear), this strategy provides a close approximation to the intended MCTE constraint.

Since resolving the problem with the active weight limits to impose MCTE constraints may (and often does) generate a solution that may now violate the 5-name constraint, we need to iterate optimization runs checking for both of these conditions and imposing the appropriate constraints as necessary. Again, while it is not ideal to run multiple optimizations, the process is easily automated and a solution can be obtained within a few minutes.

Testing and Results

We completed an implementation of the reformulated model described above to test its efficiency and effectiveness. The problem was set up as follows:

We used sample feeder funds for years 2000, 2001, 2002, and 2004 as well as the existing Master Fund.

For the pool of available securities for a 2005 Feeder Fund we used the assets that were contributed prior to Jan. 4, 2005.

On Jan. 4, 2005, a drop was performed using the current practice—manual, iterative technique. We refer to this as the 'sample' drop.

As of Jan. 4, 2005, we solve the same problem using our newly developed optimization routine. The analysis date was Jan. 4, 2005 and the benchmark was the S&P 500. We use a multi-factor risk model. We did not constrain tracking error. We constrain the portfolio beta to be 1. We constrain the industry exposures to be near zero. We do not place any constraints on the style factors.

The Table A compares the results of from the sample (i.e. as done by the desk) and optimized solutions.

TABLE A

Comparing sample and optimized solutions

| | | Sample | Optimized |
|---|---|---|---|
| Master Fund: | Total Value Before Drop: | $1,864,018,066 | Same |
| | Total Value of Drop: | $90,071,593 | $ 93,530,859 |
| | Total Value After Drop: | $1,954,089,659 | $1,957,548,926 |
| | # of assets dropped: | 26 | 54 |
| | TE Before Drop: | 3.50% | Same |
| | TE After Drop: | 3.47% | 3.46% |

TABLE A-continued

Comparing sample and optimized solutions

| | | Sample | Optimized |
|---|---|---|---|
| | Beta Before Drop: | 1.00 | Same |
| | Beta After Drop: | 1.00 | 1.00 |
| 2000 | Total Value: | $1,612,825,105 | Same |
| Feeder | TE Before Drop: | 3.61% | Same |
| | TE After Drop: | 3.61% | 3.61% |
| | Master Ownership Before: | 59.55% | Same |
| | Master Ownership After: | 56.80% | 56.70% |
| 2001 | Total Value: | $ 627,812,797 | Same |
| Feeder | TE Before Drop: | 4.72% | Same |
| | TE After Drop: | 4.74% | 4.74% |
| | Master Ownership Before: | 7.86% | Same |
| | Master Ownership After: | 7.50% | 7.48% |
| 2002 | Total Value: | $ 486,096,802 | Same |
| Feeder | TE Before Drop: | 3.98% | Same |
| | TE After Drop: | 3.98% | 3.98% |
| | Master Ownership Before: | 17.18% | Same |
| | Master Ownership After: | 16.39% | 16.36% |
| 2004 | Total Value: | $384,915,086 | Same |
| Feeder | TE Before Drop: | 3.68% | Same |
| | TE After Drop: | 3.67% | 3.67% |
| | Master Ownership Before: | 15.41% | |
| | Master Ownership After: | 14.70% | 14.67% |
| New | Total Available in the pool: | $133,619,861 | |
| Feeder | Total Value of Drop: | $90,071,593 | $ 93,530,859 |
| | Left in the Feeder: | $43,548,268 | $40,089,002 |
| | TE: | 3.63% | 3.28% |
| | Beta: | 1.02 | 1.02 |
| | Largest Industry Exposure: | −6.03% | −5.43% |
| | Master Ownership: | 4.61% | 4.78% |
| | Computation Time: | ??? | <5 min. |

The Master Fund, prior to the drop on Jan. 4, 2005 stood at a total value of $1,864,018,066.

The total value of the securities in the pool for the 2005 Feeder and new drops was $133,619,861—about 7% of the existing Master Fund.

The sample drop was worth about $90m. The optimizer recommended a drop of about $93.5m. Drop lists for both the sample and the optimized drops are provided in the Tables B and C. Both the sample and optimized drops improved the Master TE and resulting Master Funds had very similar characteristics.

Since the sample and optimized Master Funds were rather similar, the risk characteristics of Feeder Funds 2000, 2001, 2002, and 2004 were essentially identical between to the sample and optimized implementations with TEs remaining within 1 bp of each other for all feeder funds.

Most significant improvements from the optimization were observed for the new feeder fund. There were significant reductions in the tracking error as well as the largest sector and industry exposures.

Given all the data, the overall solution time for the optimizer took under 15 seconds per iteration. Because of the 5-name and MCTE constraint violations in the initial iterations, optimizations were repeated with additional constraints. A total of 14 optimizations were solved (each with one more constraint than the previous) for a total computation time of approximately three minutes. The whole process was automated requiring no intervention.

The speed at which these solutions are obtained enables extensive and rapid testing with many scenarios, alternative considerations for constraints, alternative TE targets, etc.

It is clear from the tables above that the optimized feeder portfolios have more desirable risk characteristics compared to those obtained by manual methods. However, these improvements are perhaps not the most significant contributions of the optimization model discussed above but rather the automation and flexibility it provides to a rather labor intensive process.

Tables B and C compare the drops for the sample and optimized portfolios.

TABLE B

Sample Drops in the Master Fund:

| Description | Shares | Dollar Value |
|---|---|---|
| ABC | 1,000,000 | 19,360,000 |
| DEF | 275,000 | 7,282,000 |
| HIJ | 110,000 | 6,783,700 |
| KLM | 77,428 | 5,721,155 |
| NOP | 80,000 | 5,550,400 |
| QRS | 76,104 | 5,000,033 |
| TUV | 250,000 | 5,000,000 |
| WXY | 58,470 | 4,210,425 |
| Z | 60,000 | 3,052,200 |
| AAA | 257,290 | 3,000,001 |
| BBB | 10,000 | 2,922,300 |
| CCC | 80,000 | 2,868,000 |
| DDD | 121,649 | 2,450,011 |
| EEE | 42,635 | 2,000,008 |
| FFF | 80,906 | 1,999,996 |
| GGG | 61,881 | 1,999,994 |
| HHH | 15,319 | 1,684,630 |
| III | 38,571 | 1,349,985 |
| JJJ | 34,508 | 1,290,944 |
| KKK | 50,000 | 1,186,000 |
| LLL | 15,000 | 1,114,950 |
| MMM | 34,002 | 999,999 |
| NNN | 16,200 | 989,172 |
| OOO | 54,900 | 921,222 |
| PPP | 14,908 | 830,823 |
| QQQ | 8,809 | 499,999 |

TABLE C

Optimized Drops in the Master Fund:

| Description | Shares | Dollar Value |
|---|---|---|
| ABC | 1,145,259 | $22,172,220.10 |
| DEF | 317,592 | $8,409,840.59 |
| QRS | 131,238 | $8,093,450.17 |
| WXY | 62,283 | $4,321,184.24 |
| AAA | 101,902 | $3,653,182.72 |
| DDD | 47,253 | $3,491,557.86 |
| XYZ | 48,222 | $3,472,480.20 |
| KLM | 170,820 | $3,418,113.88 |
| EEE | 66,660 | $3,391,008.99 |
| BBB | 51,496 | $3,383,290.08 |
| HIJ | 238,151 | $2,776,845.73 |
| PPP | 9,190 | $2,690,133.31 |
| CAB | 109,881 | $2,215,203.51 |
| HJT | 70,852 | $1,787,594.14 |
| HHH | 38,038 | $1,784,354.98 |
| TUV | 72,066 | $1,781,465.32 |
| CCC | 55,253 | $1,780,266.76 |
| MMM | 13,419 | $1,475,660.96 |
| NOP | 33,054 | $1,156,875.54 |
| JJJ | 29,393 | $1,099,598.12 |
| GGG | 42,084 | $998,235.37 |
| NNN | 12,501 | $929,182.46 |
| KKK | 27,910 | $820,837.01 |
| UII | 37,969 | $818,234.08 |
| LLL | 13,303 | $812,277.36 |
| FFF | 44,498 | $746,677.35 |
| KKO | 17,584 | $684,548.80 |
| OOO | 11,910 | $663,750.62 |
| LLO | 15,267 | $425,026.56 |
| OOL | 10,423 | $417,442.15 |
| QQQ | 6,503 | $369,099.28 |
| 123 | 19,604 | $362,078.58 |
| 456 | 1,739 | $344,816.40 |

TABLE C-continued

Optimized Drops in the Master Fund:

| Description | Shares | Dollar Value |
|---|---|---|
| 789 | 8,744 | $229,538.81 |
| 009 | 6,743 | $224,943.50 |
| 001 | 4,385 | $205,138.88 |
| 002 | 4,958 | $178,280.52 |
| 003 | 13,212 | $177,438.32 |
| 004 | 3,769 | $160,951.36 |
| 006 | 3,009 | $160,864.87 |
| 007 | 6,124 | $153,649.05 |
| 008 | 3,202 | $144,908.82 |
| 000 | 4,362 | $142,434.84 |
| 111 | 2,210 | $140,701.78 |
| 222 | 2,513 | $131,177.96 |
| 333 | 1,871 | $121,775.64 |
| 444 | 1,840 | $107,522.74 |
| 555 | 3,607 | $99,698.27 |
| 666 | 1,185 | $90,106.80 |
| 777 | 2,384 | $89,170.87 |
| 888 | 2,375 | $84,063.76 |
| 999 | 1,619 | $75,495.75 |
| 990 | 2,685 | $64,348.73 |
| 991 | 156 | $2,115.30 |
| XYZ | 0 | $0.00 |

Figure 1:
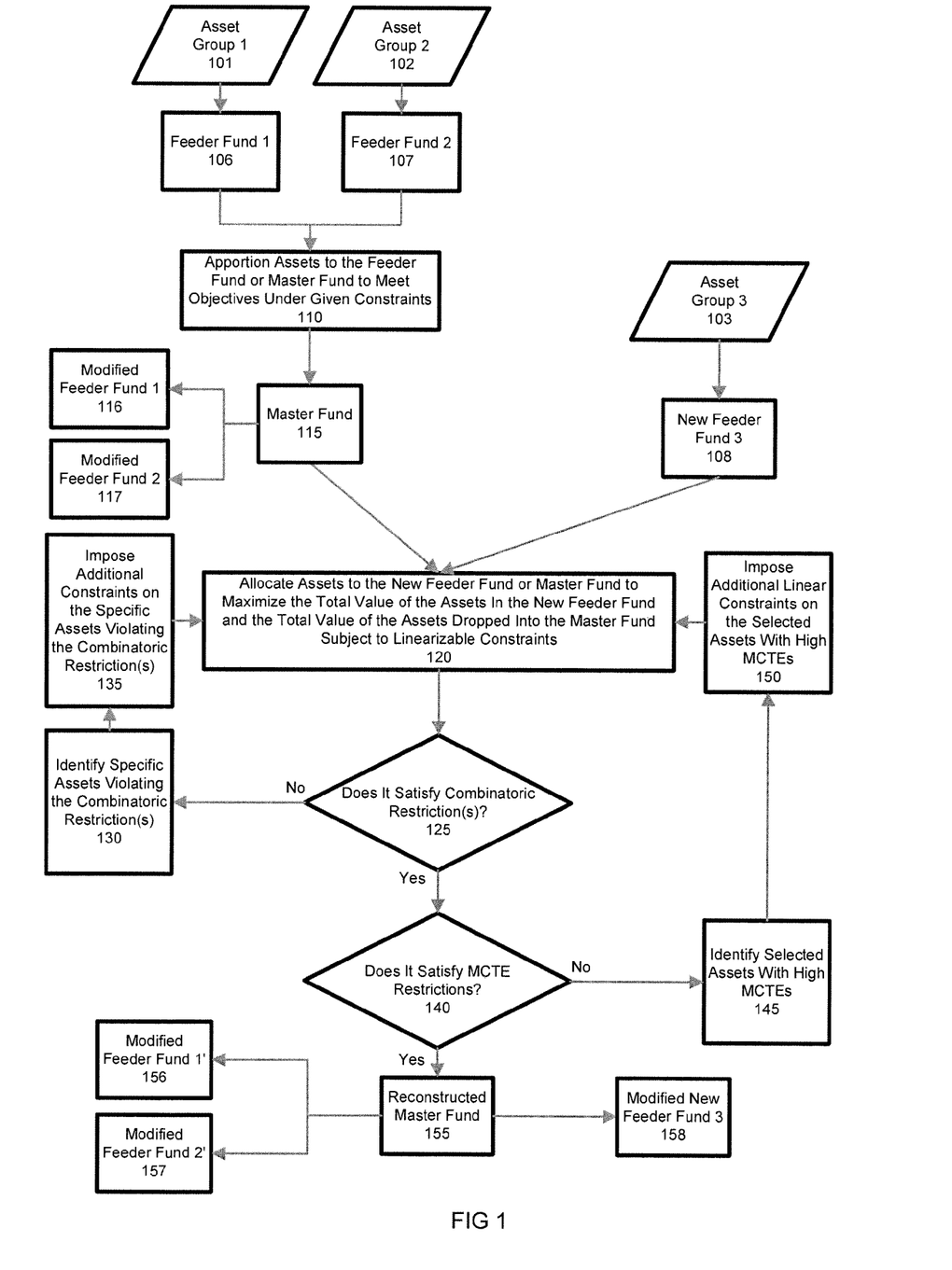
FIG. 1 of the present disclosure provides a flow diagram for one embodiment of the exchange fund transactor.

FIG. 1 provides a flow diagram for one example implementation of the Transactor. In one embodiment, as discussed in Section 1, asset groups 101, 102 may be organized into exchange or feeder funds 106, 107. In order to provide an additional level of diversification, assets from the feeder funds 106, 107 are apportioned 110 to the master fund 115 or respective modified feeder funds 116, 117 in order to meet certain objectives while following required constraints, as discussed in Section 3. Additionally, as previously discussed, each feeder fund "owns" a portion of the master fund 115.

For an existing master fund 115, there may be a situation where a new asset pool or new asset group 103 is being considered for inclusion in a new feeder fund 108 and/or the master fund. The Transactor may then determine optimal allocation of the assets to the new feeder fund and/or a reconstructed master fund 155 as discussed in section 4.1. Assets are allocated 120 to maximize the total value of assets in the new feeder fund and the total value of the assets dropped into the master fund. As discussed in Section 4.4, the maximization $$\left(e.g., \max \sum_k V_{k,F} + \sum_k V_{M,k,F}\right)$$

may be constrained by linearized constraints, for example, the following previously discussed constraints:

$$0 \leq V_{k,F}, 0 \leq V_{M,k,F}, V_{k,F} + V_{M,k,F} \leq S_{k,F}^{max} P_k. \tag{C0'}$$

$$0.70 \sum_k V_{k,F} - 0.30 \sum_k V_{M,k,F} \geq 0 \tag{C1'}$$

$$V_{M,k,F} \leq 0.25 \sum_k V_{M,k,F} \tag{C2'}$$

and V=0.

The asset allocation of 120 may then be tested to determine if it satisfies combinatoric restriction(s) 125, as previously illustrated in the paragraph 104 discussion of example constraint $$\sum_{any\ 5\ stocks} \frac{V_{k,f}}{V_{M,f} - V_{M,f}^0} \leq 0.50. \tag{C3}$$

Further embodiments of the Transactor may include additional restrictions that are not easily linearized. If the asset allocation does not satisfy the restrictions, the assets that violate the restrictions are identified 130, additional constraints are imposed 135 on the identified assets and the additional constraints are included in optimizing the asset allocation 120. This implementation may be iterated until asset allocation satisfies the combinatoric restriction(s). The resulting asset allocation may then be tested to determine if it satisfies MCTE restrictions 140. If the MCTE restrictions are not met, assets with high MCTEs are identified 145 and the active weights of the identified assets are limited using linear constraints 150 included in optimizing the asset allocation 120, and then iterating the implementation until the both restrictions 125, 140 are satisfied. The optimized asset allocation is then implemented in the reconstructed master fund 155, of which the modified new feeder fund 158 and existing modified feeder funds 156, 157 each "own" a portion.

Exchange Fund Transactor Controller

Figure 2:
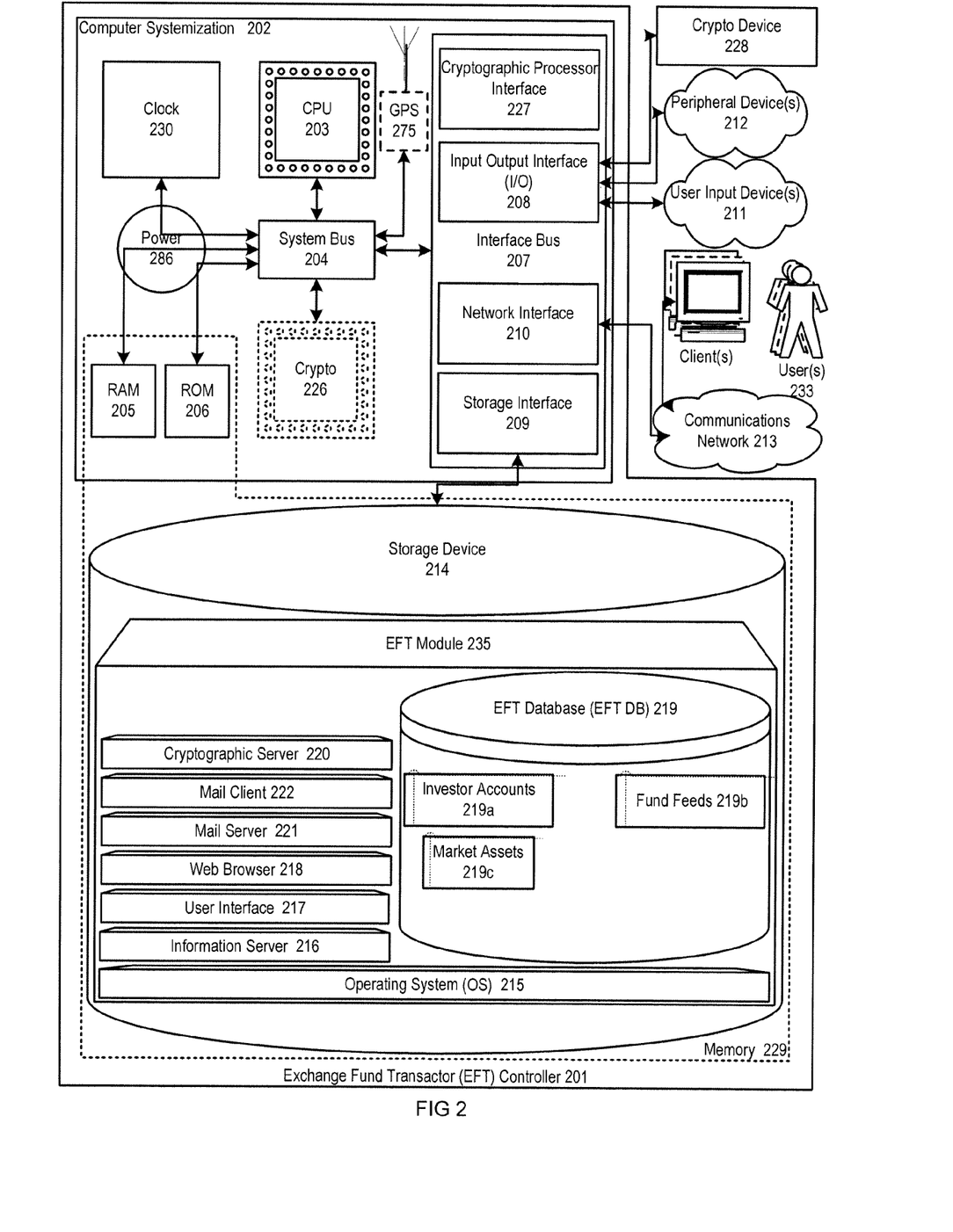
FIG. 2 of the present disclosure illustrates inventive aspects of a exchange fund transactor controller in a block diagram.

FIG. 2 of the present disclosure illustrates inventive aspects of an exchange fund transactor controller 201 in a block diagram. In this embodiment, the exchange fund transactor controller 201 may serve to process, store, search, serve, identify, instruct, generate, match, and/or exchange investor assets in asset funds.

Typically, users, which may be people (e.g., investors, financial advisors, etc.) and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the exchange fund transactor controller 201 may be connected to and/or communicate with entities such as, but not limited to: one or more users from user input devices 211; peripheral devices 212; a cryptographic processor device 228; and/or a communications network 213.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless. Networks (WLANs), etc. For example, the Internet is generally accepted as being an interconnection of a multitude of networks whereby remote clients and servers may access and interoperate with one another. The exchange fund transactor controller 201 may be based on common computer systems that may comprise, but are not limited to, components such as: a computer systemization 202 connected to memory 229.

Computer Systemization

A computer systemization 202 may comprise a clock 230, central processing unit (CPU) 203, a read only memory (ROM) 206, a random access memory (RAM) 205, and/or an interface bus 207, and most frequently, although not necessarily, are all interconnected and/or communicating through a system bus 204. Optionally, the computer systemization may be connected to an internal power source 286. Optionally, a cryptographic processor 226 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the exchange fund transactor controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 286 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 286 is connected to at least one of the interconnected subsequent components of the exchange fund transactor thereby providing an electric current to all subsequent components. In one example, the power source 286 is connected to the system bus component 204. In an alternative embodiment, an outside power source 286 is provided through a connection across the I/O 208 interface. For example, a USB and/or IEEE 1394 connection carries both data and power across the connection and is therefore a suitable source of power.

Interface Adapters

Interface bus(ses) 207 may accept, connect, and/or communicate to a number of interface adapters, conventionally although not necessarily in the form of adapter cards, such as but not limited to: input output interfaces (I/O) 208, storage interfaces 209, network interfaces 210, and/or the like. Optionally, cryptographic processor interfaces 227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 209 may accept, communicate, and/or connect to a number of storage devices such as, but not limited to: storage devices 214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 210 may accept, communicate, and/or connect to a communications network 213. Through a communications network 113, the exchange fund transactor controller is accessible through remote clients 233b (e.g., computers with web browsers) by users 233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 210 may be used to engage with various communications network types 213. For example, multiple network interfaces may be employed to allow for the communication over broadcast, multicast, and/or unicast networks. Input Output interfaces (I/O) 208 may accept, communicate, and/or connect to user input devices 211, peripheral devices 212, cryptographic processor devices 228, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 211 may be card readers, dongles, finger print readers, gloves, graphics tablets, joysticks, keyboards, mouse (mice), remote controls, retina readers, trackballs, trackpads, and/or the like.

Peripheral devices 212 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the exchange fund transactor controller may be embodied as an embedded, dedicated, and/or monitor-less (i.e., headless) device, wherein access would be provided over a network interface connection.

Cryptographic units such as, but not limited to, microcontrollers, processors 226, interfaces 227, and/or devices 228 may be attached, and/or communicate with the exchange fund transactor controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 229. However, memory is a fungible technology and resource, thus, any number of memory embodiments may be employed in lieu of or in concert with one another. It is to be understood that the exchange fund transactor controller and/or a computer systemization may employ various forms of memory 229. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 229 will include ROM 206, RAM 205, and a storage device 214. A storage device 214 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 229 may contain a collection of program and/or database modules and/or data such as, but not limited to: operating system module(s) 215 (operating system); information server module(s) 216 (information server); user interface module(s) 217 (user interface); Web browser module(s) 218 (Web browser); database(s) 219; cryptographic server module(s) 220 (cryptographic server); the exchange fund transactor module(s) 235; and/or the like (i.e., collectively a module collection). These modules may be stored and accessed from the storage devices and/or from storage devices accessible through an interface bus. Although non-conventional software modules such as those in the module collection, typically, are stored in a local storage device 214, they may also be loaded and/or stored in memory such as: peripheral devices, RAM, remote storage facilities through a communications network, ROM, various forms of memory, and/or the like.

Operating System

The operating system module 215 is executable program code facilitating the operation of the exchange fund transactor controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millennium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the exchange fund transactor controller to communicate with other entities through a communications network 213. Various communication protocols may be used by the exchange fund transactor controller as a subcarrier transport mechanism for interaction, such as, but not limited to: multicast, TCP/IP, UDP, unicast, and/or the like.

Information Server

An information server module 216 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the exchange fund transactor controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the exchange fund transactor database 219, operating systems, other program modules, user interfaces, Web browsers, and/or the like.

Access to the exchange fund transactor database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Exchange fund transactor. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the exchange fund transactor as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 217 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 218 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the exchange fund transactor enabled nodes. The combined application may be nugatory on systems employing standard Web browsers.

Cryptographic Server

A cryptographic server module 220 is stored program code that is executed by the CPU 203, cryptographic processor 226, cryptographic processor interface 227, cryptographic processor device 228, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the exchange fund transactor may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the exchange fund transactor module to engage in secure transactions if so desired. The cryptographic module facilitates the secure accessing of resources on the exchange fund transactor and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Exchange Fund Transactor Database

The exchange fund transactor database module 219 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the exchange fund transactor database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the exchange fund transactor database is implemented as a data-structure, the use of the exchange fund transactor database 219 may be integrated into another module such as the exchange fund transactor module 235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 219 includes several tables 219*a-c*. An investor accounts holdings table 219*a* includes fields such as, but not limited to: investor ID, account IDs, transaction history, asset holdings, asset holding information, and/or the like. A fund feeds table 219*c* includes fields such as, but not limited to: fund ID, fund value, index value, an asset ID, and/or the like. An market asset table 219*d* includes fields such as, but not limited to: an asset ID, an asset name, an asset bid value, an asset offer value, and/or the like.

In one embodiment, the exchange fund transactor database may interact with other database systems. For example, employing a distributed database system, queries and data access by the exchange fund transactor modules may treat the combination of the an exchange fund transactor and exchange fund transactor database as a single database entity. It should be noted that an exchange fund transactor version of the exchange fund transactor database might not have an employer account table and/or other tables specific to an exchange fund transactor database.

In one embodiment, user programs may contain various user interface primitives, which may serve to update the exchange fund transactor. Also, various accounts may require custom database tables depending upon the environments and the types of clients the exchange fund transactor may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 219*a-d*. The exchange fund transactor may be configured to keep track of various settings, inputs, and parameters via database controllers.

The exchange fund transactor database may communicate to and/or with other modules in a module collection, including itself, and/or facilities of the like. Most frequently, the exchange fund transactor database communicates with the exchange fund transactor module, other program modules, and/or the like. The database may contain, retain, and provide information regarding other nodes and data.

The Exchange Fund Transactor

The exchange fund transactor module 235 is stored program code that is executed by the CPU. The exchange fund transactor affects accessing, obtaining and the provision of information, services, transactions, and/or the like across various communications networks.

The exchange fund transactor module enables generation of transactions for investors to contribute to such various asset funds and achieve investment fund optimizations for such exchanges.

The exchange fund transactor module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the exchange fund transactor server employs a cryptographic server to encrypt and decrypt communications. The exchange fund transactor module may communicate to and/or with other modules in a module collection, including itself, and/or facilities of the like. Most frequently, the exchange fund transactor module communicates with the exchange fund transactor database, operating systems, other program modules, and/or the like. The exchange fund transactor may contain, communicate, generate, obtain, and/or provide program module, system, user, and/or data communications, requests, and/or responses.

Distributed Exchange Fund Transactor

The structure and/or operation of any of the exchange fund transactor node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the exchange fund transactor controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like, Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A computer-implemented method to adjust fund allocation, comprising:
creating, on a processor, feeder funds;
generating, on the processor, a master fund from contributions from the feeder funds;
identifying, on the processor, a pool of available securities provided by investors;
selecting, on the processor, securities from the pool to modify the master fund such that:
new values of stock in the master fund are equal to the old values plus drops,
new total value of the master fund is equal to the old value plus the total drops,
the risk taken by each feeder fund is maintained below predetermined tracking error targets for each of the feeder funds; and
adjusting, on the processor, the fund allocation in the master fund based on the selection of securities from the pool such that the new total value of the master fund is maximized while maintaining the risk taken by each feeder fund below its associated predetermined tracking error target.

2. The method of claim 1, further comprising:
maximizing the value of the master fund such that exposure and the tracking error targets are constrained and satisfied as such:

$$\max_{S_{M,k,f}} \sum_f \sum_{k \in T_f} \left[ \left( 1 - \frac{\sum_{k \in T_f} S_{M,k,f} P_k}{\sum_f \sum_{k \in T} S_{M,k,f} P_k} \right) (S^0_{k,f} P_k - S_{M,k,f} P_k) + \left( 1 - \frac{\sum_{k \in T_f} S_{M,k,f} P_k}{\sum_f \sum_{k \in T_f} S_{M,k,f} P_k} \right) S_{M,k,f} P_k \right].$$

3. The method of claim 1, wherein selecting securities from the pool to modify the master fund includes maintaining drops from each feeder fund below a specified percentage of the total drops.

4. The method of claim 1, wherein selecting securities from the pool to modify the master fund includes maintaining a combined contribution of a specified subset of feeder funds to the total drops below a specified percentage of the total drops.

5. The method of claim 1, wherein selecting securities from the pool to modify the master fund includes maintaining the risk taken by each feeder fund below a previous value of risk taken by each feeder fund.

6. The method of claim 1, wherein selecting securities from the pool to modify the master fund includes iteratively,
identifying a proposed fund allocation in the master fund from the pool of available securities;
calculating the risk taken by each feeder fund according to the proposed fund allocation in the master fund; and
determining whether the risk taken by each feeder fund according to the proposed fund allocation in the master fund is maintained below the predetermined targeted tracking error associated with the feeder fund,
until it is determined that the risk taken by each feeder fund according to the proposed fund allocation in the master fund is maintained below the predetermined targeted tracking error associated with the feeder fund.

7. The method of claim 6, further including, in each iteration,
adding a constraint in identifying a proposed fund allocation in the master fund from the pool of available securities in a next iteration, if it is determined that the risk taken by each feeder fund according to the proposed fund allocation in the master fund is not maintained below the predetermined targeted tracking error associated with the feeder fund.

8. A system for adjusting fund allocation, comprising:
a processor;
a memory in communication with the processor and storing processor-executable instructions, the instructions comprising instructions for:
identifying at least two feeder funds;
generating a master fund from contributions from the feeder funds, wherein each of the at least two feeder funds owns a portion of the master fund;
identifying a pool of available securities provided by investors;
selecting securities from the pool to modify the master fund such that:
new values of stock in the master fund are equal to the old values plus drops,
new total value of the master fund is equal to the old value plus the total drops,
the risk taken by each feeder fund is maintained below predetermined targeted tracking errors for each of the feeder funds; and
adjusting the fund allocation in the master fund based on the selection of securities from the pool such that the new total value of the master fund is maximized while maintaining the risk taken by each feeder fund below its associated predetermined tracking error target.

9. The system of claim 8, wherein the program instructions further comprise:
maximizing the value of the master fund such that exposure and the tracking error targets are constrained and satisfied as such:

$$\max_{S_{M,k,f}} \sum_f \sum_{k \in T_f} \left[ \left( 1 - \frac{\sum_{k \in T_f} S_{M,k,f} P_k}{\sum_f \sum_{k \in T} S_{M,k,f} P_k} \right) (S^0_{k,f} P_k - S_{M,k,f} P_k) + \left( 1 - \frac{\sum_{k \in T_f} S_{M,k,f} P_k}{\sum_f \sum_{k \in T_f} S_{M,k,f} P_k} \right) S_{M,k,f} P_k \right].$$

10. The system of claim 8, wherein selecting securities from the pool to modify the master fund includes maintaining drops from each feeder fund below a specified percentage of the total drops.

11. The system of claim 8, wherein selecting securities from the pool to modify the master fund includes maintaining a combined contribution of a specified subset of feeder funds to the total drops below a specified percentage of the total drops.

12. The system of claim 8, wherein selecting securities from the pool to modify the master fund includes maintaining the risk taken by each feeder fund below a previous value of risk taken by each feeder fund.

13. The system of claim 8, wherein selecting securities from the pool to modify the master fund includes iteratively,
identifying a proposed fund allocation in the master fund from the pool of available securities;
calculating the risk taken by each feeder fund according to the proposed fund allocation in the master fund; and
determining whether the risk taken by each feeder fund according to the proposed fund allocation in the master fund is maintained below the predetermined targeted tracking error associated with the feeder fund,
until it is determined that the risk taken by each feeder fund according to the proposed fund allocation in the master fund is maintained below the predetermined targeted tracking error associated with the feeder fund.

14. The system of claim 13, further including, in each iteration,
adding a constraint in identifying a proposed fund allocation in the master fund from the pool of available securities in a next iteration, if it is determined that the risk taken by each feeder fund according to the proposed fund allocation in the master fund is not maintained below the predetermined targeted tracking error associated with the feeder fund.

15. A processor-implemented method for adjusting fund allocation, comprising:
identifying, on a processor, at least two feeder funds;
generating, on the processor, a master fund from contributions from the at least two feeder funds such that each of the at least two feeder funds has an ownership share of the master fund;
identifying, on the processor, a pool of available securities;
selecting, on the processor, securities from the pool to modify the master fund such that:
new values of stock in the master fund are equal to the old values plus drops,
new total value of the master fund is equal to the old value plus the total drops,
the risk taken by each feeder fund is maintained below predetermined targeted tracking errors for each of the feeder funds; and
adjusting, on the processor, the fund allocation in the master fund based on the selection of securities from the pool such that the new total value of the master fund is maximized while maintaining the risk taken by each feeder fund below its associated predetermined tracking error target; and
maximizing the value of the master fund, on the processor, such that exposure and the tracking error targets are constrained and satisfied as such:

$$\max_{S_{M,k,f}} \sum_f \sum_{k \in T_f} \left[ \left( 1 - \frac{\sum_{k \in T_f} S_{M,k,f} P_k}{\sum_f \sum_{k \in T} S_{M,k,f} P_k} \right) (S^0_{k,f} P_k - S_{M,k,f} P_k) + \left( 1 - \frac{\sum_{k \in T_f} S_{M,k,f} P_k}{\sum_f \sum_{k \in T_f} S_{M,k,f} P_k} \right) S_{M,k,f} P_k \right].$$

16. The method of claim 15, wherein selecting securities from the pool to modify the master fund includes maintaining drops from each feeder fund below a specified percentage of the total drops.

17. The method of claim 15, wherein selecting securities from the pool to modify the master fund includes maintaining a combined contribution of a specified subset of feeder funds to the total drops below a specified percentage of the total drops.

18. The method of claim 15, wherein selecting securities from the pool to modify the master fund includes maintaining the risk taken by each feeder fund below a previous value of risk taken by each feeder fund.

19. The method of claim 15, wherein selecting securities from the pool to modify the master fund includes iteratively,
identifying a proposed fund allocation in the master fund from the pool of available securities;
calculating the risk taken by each feeder fund according to the proposed fund allocation in the master fund; and
determining whether the risk taken by each feeder fund according to the proposed fund allocation in the master fund is maintained below the predetermined targeted tracking error associated with the feeder fund,
until it is determined that the risk taken by each feeder fund according to the proposed fund allocation in the master fund is maintained below the predetermined targeted tracking error associated with the feeder fund.

20. The method of claim 19, further including, in each iteration,
adding a constraint in identifying a proposed fund allocation in the master fund from the pool of available securities in a next iteration, if it is determined that the risk taken by each feeder fund according to the proposed fund allocation in the master fund is not maintained below the predetermined targeted tracking error associated with the feeder fund.

* * * * *